(12) United States Patent
Omori

(10) Patent No.: US 11,879,873 B2
(45) Date of Patent: Jan. 23, 2024

(54) FLEXURAL-RIGIDITY MEASURING APPARATUS AND METHOD FOR MEASURING FLEXURAL RIGIDITY

(71) Applicant: FUJIFILM Business Innovation Corp., Tokyo (JP)

(72) Inventor: Masao Omori, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 219 days.

(21) Appl. No.: 17/542,509

(22) Filed: Dec. 6, 2021

(65) Prior Publication Data

US 2023/0032653 A1 Feb. 2, 2023

(30) Foreign Application Priority Data

Jul. 29, 2021 (JP) ................. 2021-124699

(51) Int. Cl.
*G01N 3/32* (2006.01)
*G01N 3/06* (2006.01)
*G01N 21/359* (2014.01)
*G01N 21/86* (2006.01)
*G01N 27/02* (2006.01)

(52) U.S. Cl.
CPC ............... *G01N 3/32* (2013.01); *G01N 3/068* (2013.01); *G01N 27/025* (2013.01); *G01N 2203/0008* (2013.01); *G01N 2203/0641* (2013.01)

(58) Field of Classification Search
CPC ........... G01N 3/06; G01N 3/32; G01N 27/02; G01N 21/86; G01N 3/08; G01N 21/3563; G01N 21/35; G01N 29/48; G01N 29/07; G01N 21/9505; G01N 2291/0258
See application file for complete search history.

(56) References Cited

U.S. PATENT DOCUMENTS 6,543,288 B1 * 4/2003 Blouin ................ G01L 5/042
73/159
2013/0220007 A1 * 8/2013 Blair .................. G01B 11/0625
73/150 R

FOREIGN PATENT DOCUMENTS

| JP | H06331322 A | * | 5/1993 | ............. G01B 11/06 |
| JP | H11237377 | | 8/1999 | |
| JP | 2007039242 | | 2/2007 | |

* cited by examiner

*Primary Examiner* — Brandi N Hopkins
(74) *Attorney, Agent, or Firm* — JCIPRNET

(57) ABSTRACT

A flexural-rigidity measuring apparatus includes an ultrasonic device including an oscillating unit that oscillates an ultrasonic wave toward a sheet and a receiving unit that receives the ultrasonic wave that has passed through the sheet, an electromagnetic induction device including an electromagnetic induction unit that generates electromagnetic induction with respect to a sheet, and a near-infrared spectroscopic device including a light-emitting unit that emits near-infrared light toward a sheet and a light-receiving unit that receives the near-infrared light that has passed through the sheet.

14 Claims, 13 Drawing Sheets

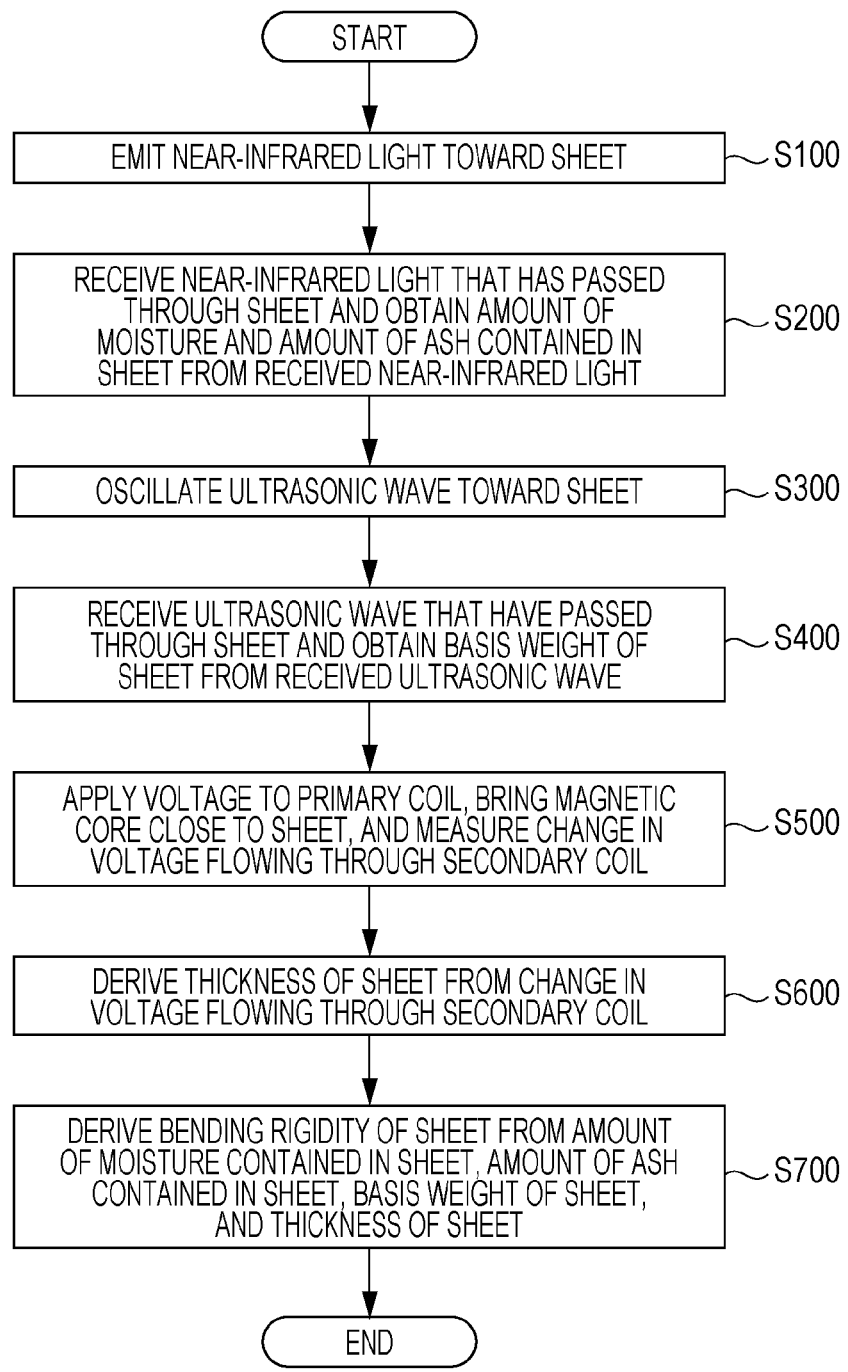

FLEXURAL-RIGIDITY MEASURING APPARATUS AND METHOD FOR MEASURING FLEXURAL RIGIDITY

CROSS-REFERENCE TO RELATED APPLICATIONS

This application is based on and claims priority under 35 USC 119 from Japanese Patent Application No. 2021-124699 filed Jul. 29, 2021.

BACKGROUND

(i) Technical Field

The present disclosure relates to a flexural-rigidity measuring apparatus that measures the flexural rigidity of a sheet and a method for measuring flexural rigidity.

(ii) Related Art

Japanese Unexamined Patent Application Publication No. 11-237377 describes an apparatus for measuring the quality of paper or sheet that is capable of measuring the basis weight, the coating amount, the moisture content, the ash content, and so forth of a sheet by using light in the near-infrared region.

In the related art, an apparatus that measures the flexural rigidity of a sheet needs to process a sheet such that the sheet has a predetermined size.

SUMMARY

Aspects of non-limiting embodiments of the present disclosure relate to measuring the flexural rigidity of a sheet without processing the sheet such that the sheet has a predetermined size.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a flexural-rigidity measuring apparatus including an ultrasonic device including an oscillating unit that oscillates an ultrasonic wave toward a sheet and a receiving unit that receives the ultrasonic wave that has passed through the sheet, an electromagnetic induction device including an electromagnetic induction unit that generates electromagnetic induction with respect to a sheet, and a near-infrared spectroscopic device including a light-emitting unit that emits near-infrared light toward a sheet and a light-receiving unit that receives the near-infrared light that has passed through the sheet.

BRIEF DESCRIPTION OF THE DRAWINGS

Exemplary embodiments of the present disclosure will be described in detail based on the following figures, wherein:

FIG. 8 is a flowchart illustrating control of each device that is performed by a controller included in the flexural-rigidity measuring apparatus according to the first exemplary embodiment of the present disclosure;

DETAILED DESCRIPTION

First Exemplary Embodiment

Figure 1:
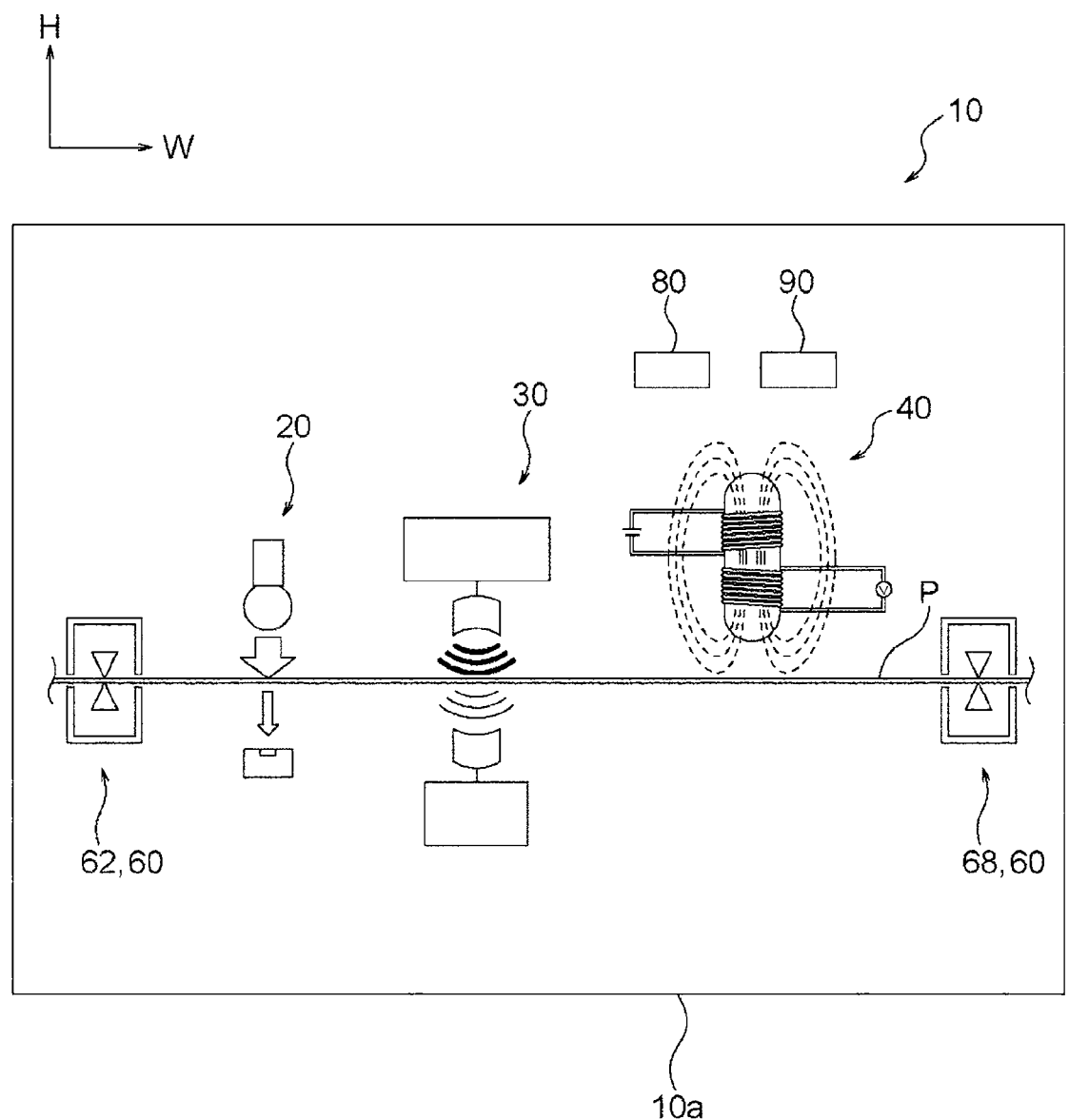
FIG. 1 is a schematic diagram illustrating a configuration of a flexural-rigidity measuring apparatus according to a first exemplary embodiment of the present disclosure.

An example of a flexural-rigidity measuring apparatus according to the first exemplary embodiment of the present disclosure will be described with reference to FIG. 1 to FIG. 9(C). Note that, in the drawings, arrow H indicates the vertical direction and the heightwise direction of the flexural-rigidity measuring apparatus (hereinafter referred to as "apparatus height direction"), and arrow W indicates the horizontal direction and the widthwise direction of the flexural-rigidity measuring apparatus (hereinafter referred to as "apparatus width direction").

(Overall Configuration of Flexural-Rigidity Measuring Apparatus 10)

A flexural-rigidity measuring apparatus 10 is an apparatus that measures the flexural rigidity of a sheet P, which is a member to be measured, and includes an apparatus body 10a, a near-infrared spectroscopic device 20, an ultrasonic device 30, and an electromagnetic induction device 40 as illustrated in FIG. 1. The flexural-rigidity measuring apparatus 10 further includes an attachment unit 60 to which the sheet P is attached, a controller 80 that controls each unit, and a derivation unit 90 that derives the flexural rigidity of the sheet P. The near-infrared spectroscopic device 20, the ultrasonic device 30, and the electromagnetic induction device 40 are arranged in this order from one side (the left-hand side in FIG. 1) to the other side (the right-hand side in FIG. 1) in the apparatus width direction.

Here, the sheet P is produced by agglutinating plant fibers or other fibers. In addition, the flexural rigidity of the sheet P refers to the resistance of paper P to bending deformation, and the higher the flexural rigidity, the less the sheet P may be deformed. Note that the term "flexural rigidity" may sometimes be referred to as "bending stiffness".

[Near-Infrared Spectroscopic Device 20]

Figure 2:
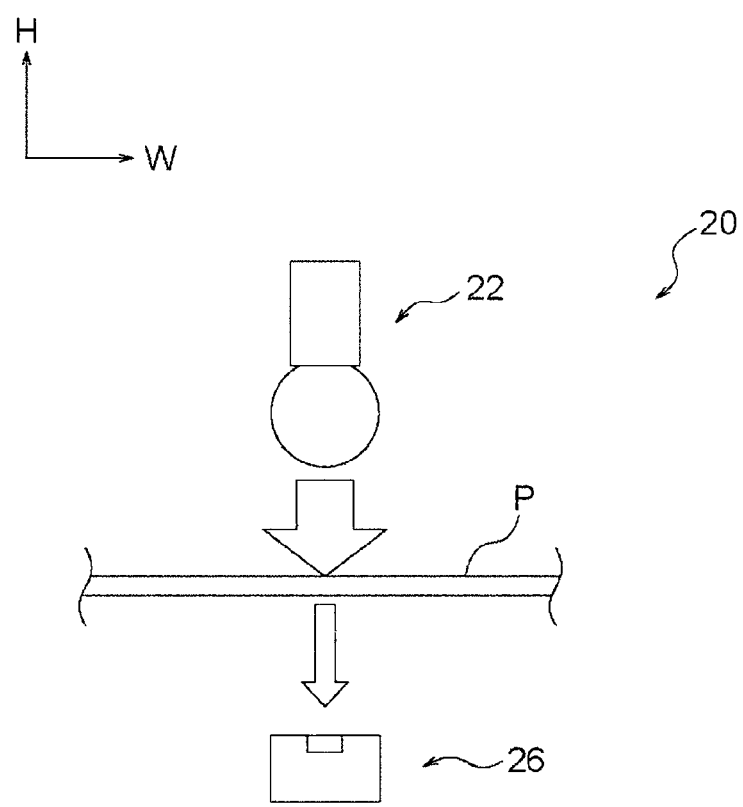
FIG. 2 is a diagram illustrating a configuration of a near-infrared spectroscopic device included in the flexural-rigidity measuring apparatus according to the first exemplary embodiment of the present disclosure.

As illustrated in FIG. 2, the near-infrared spectroscopic device 20 (hereinafter referred to as "spectroscopic device 20") includes a light-emitting unit 22 and a light-receiving unit 26. When a sheet surface of the sheet P is oriented in the vertical direction, the light-emitting unit 22 is located above the sheet P, and the light-receiving unit 26 is located below the sheet P.

The light-emitting unit 22 is configured to emit near-infrared light toward the sheet P. The light-receiving unit 26 is a near-infrared spectroscopic sensor and is configured to receive light that has passed through the sheet P and disperse the received light into different wavelengths so as to measure the intensity distribution (spectrum) of the light absorbed by the sheet P.

Figure 3:
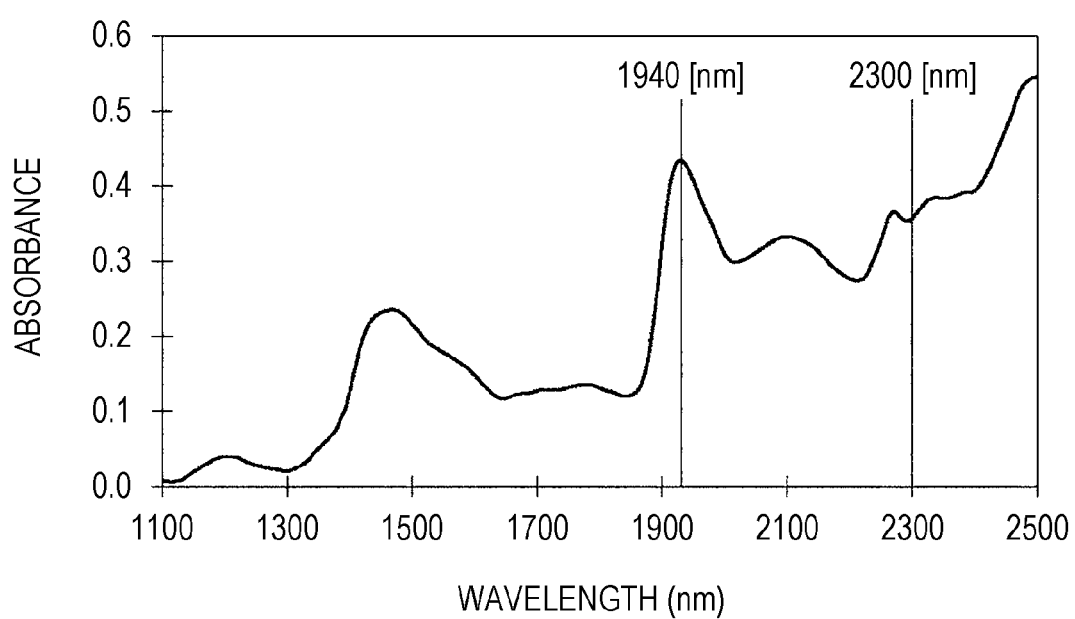
FIG. 3 is a graph illustrating the intensity distribution of light measured by the near-infrared spectroscopic device of the flexural-rigidity measuring apparatus according to the first exemplary embodiment of the present disclosure.

In the above configuration, the light-receiving unit 26 measures the intensity distribution of the light absorbed by the sheet P for each wavelength as illustrated in the graph in FIG. 3. In the graph illustrated in FIG. 3, the vertical axis denotes absorbance, that is, how much the intensity of near-infrared light has decreased as a result of the near-infrared light passing through the sheet P. In the graph illustrated in FIG. 3, the horizontal axis denotes wavelength. Here, the wavelength of the intrinsic absorption of moisture contained in the sheet P is 1,940 nm, and the wavelength of the intrinsic absorption of ash contained in the sheet P is 2,300 nm. The light-receiving unit 26 obtains the amount of moisture from the absorbance at a wavelength of 1,940 nm and obtains the amount of ash from the absorbance at a wavelength of 2,300 nm by using a conversion table that is stored beforehand.

[Ultrasonic Device 30]

Figure 4:
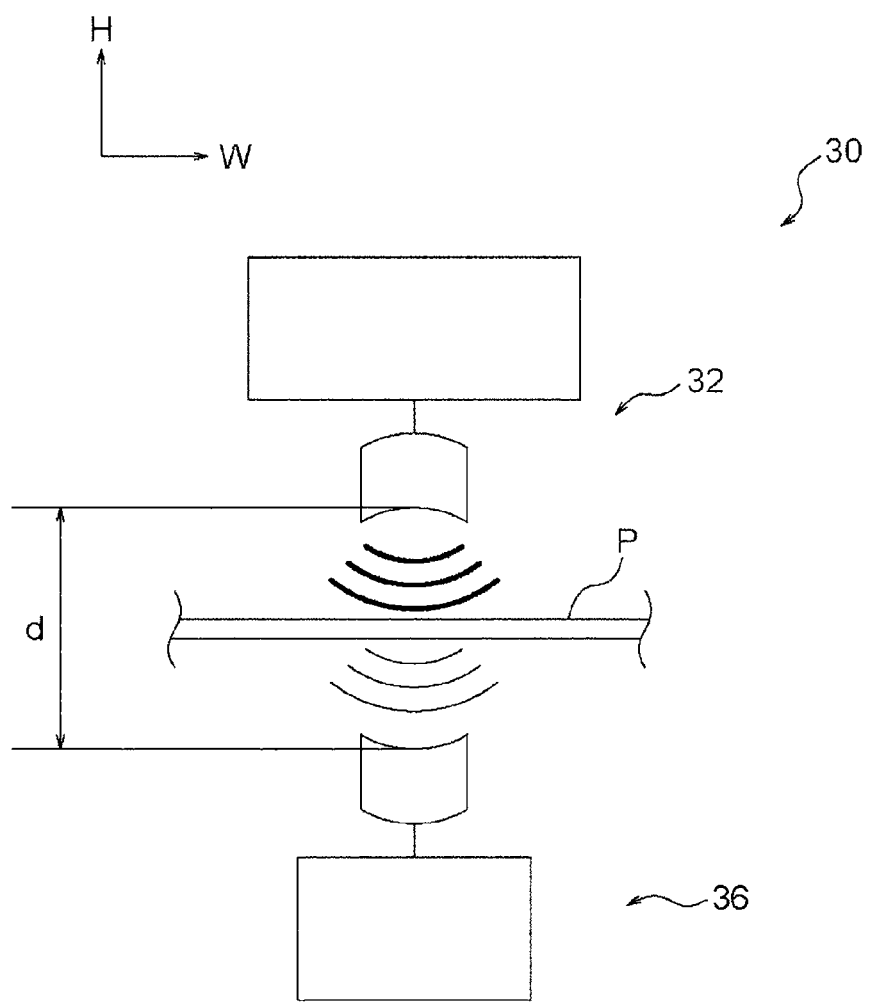
FIG. 4 is a diagram illustrating a configuration of an ultrasonic device included in the flexural-rigidity measuring apparatus according to the first exemplary embodiment of the present disclosure.

As illustrated in FIG. 4, the ultrasonic device 30 includes an oscillating unit 32 and a receiving unit 36. When the sheet surface of the sheet P is oriented in the vertical direction, the oscillating unit 32 is located above the sheet P, and the receiving unit 36 is located below the sheet P.

The oscillating unit 32 is an ultrasonic oscillator and intermittently oscillates an ultrasonic wave toward the sheet P. The receiving unit 36 is configured to receive an ultrasonic wave that has passed through the sheet P.

Figure 5:
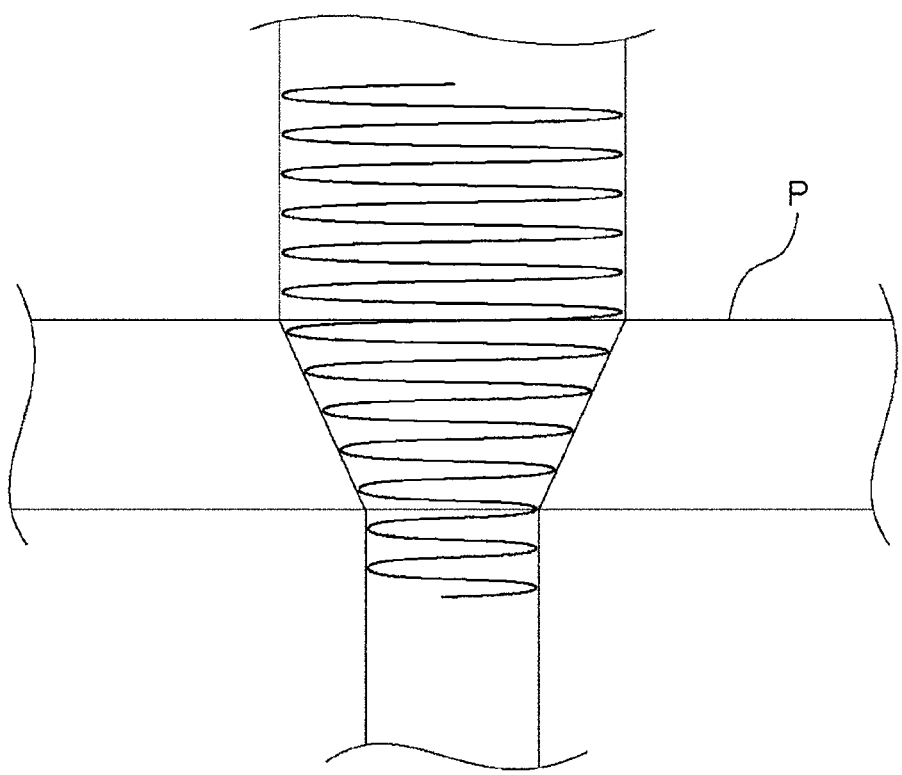
FIG. 5 is a schematic diagram illustrating a state where an ultrasonic wave emitted by the ultrasonic device of the flexural-rigidity measuring apparatus according to the first exemplary embodiment of the present disclosure are passing through a sheet.

In the above configuration, as illustrated in FIG. 5, the ultrasonic wave oscillated by the oscillating unit 32 is absorbed by the sheet P and attenuated by passing through the sheet P. The receiving unit 36 receives the attenuated ultrasonic wave and measures the attenuation rate of the ultrasonic wave.

In addition, the receiving unit 36 obtains the amplitude of the ultrasonic wave that has passed through the sheet P by using the attenuation rate of the ultrasonic wave and the distance between the oscillating unit 32 and the receiving unit 36 (d in FIG. 4). Then, the receiving unit 36 obtains the basis weight of the sheet P from the amplitude of the ultrasonic wave, which has passed through the sheet P, by using a conversion table that is stored beforehand. Note that the larger the basis weight of the sheet P, the smaller the amplitude of the ultrasonic wave passed through the sheet P.

[Electromagnetic Induction Device 40]

Figure 6A:
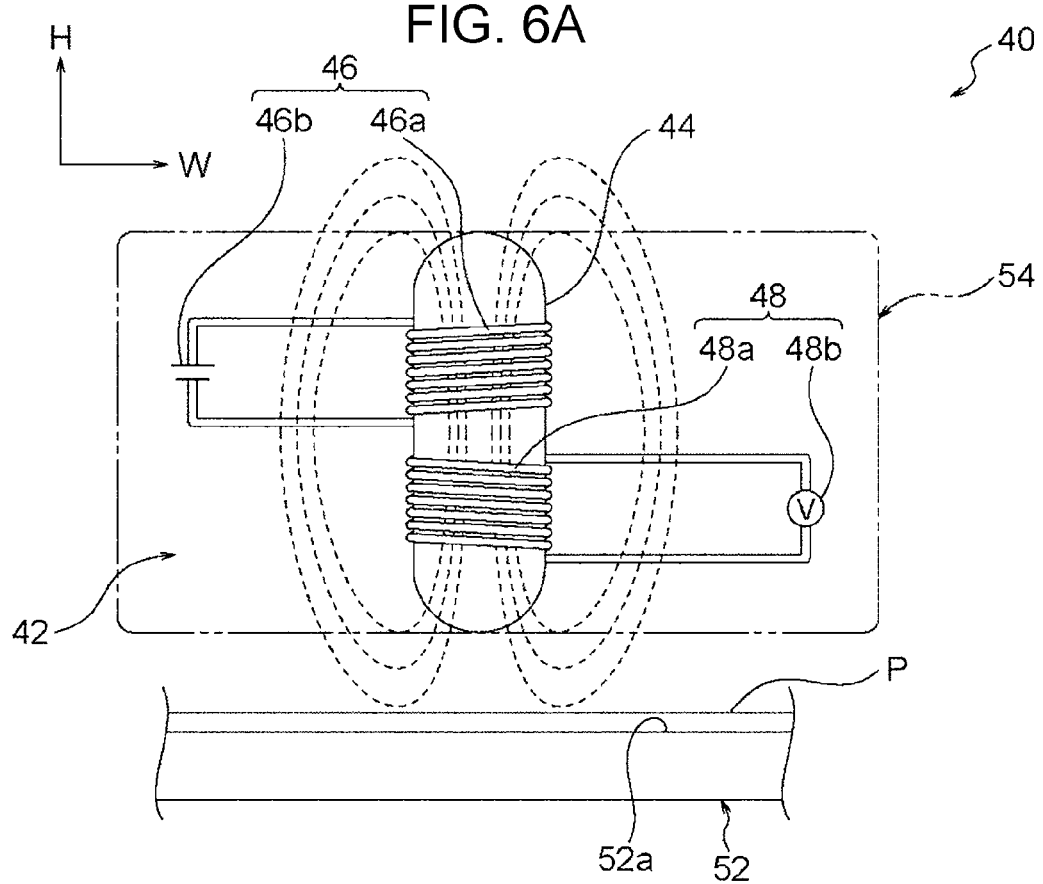
FIGS. 6A and 6B are diagrams each illustrating a configuration of an electromagnetic induction device included in the flexural-rigidity measuring apparatus according to the first exemplary embodiment of the present disclosure.
Figure 6B:
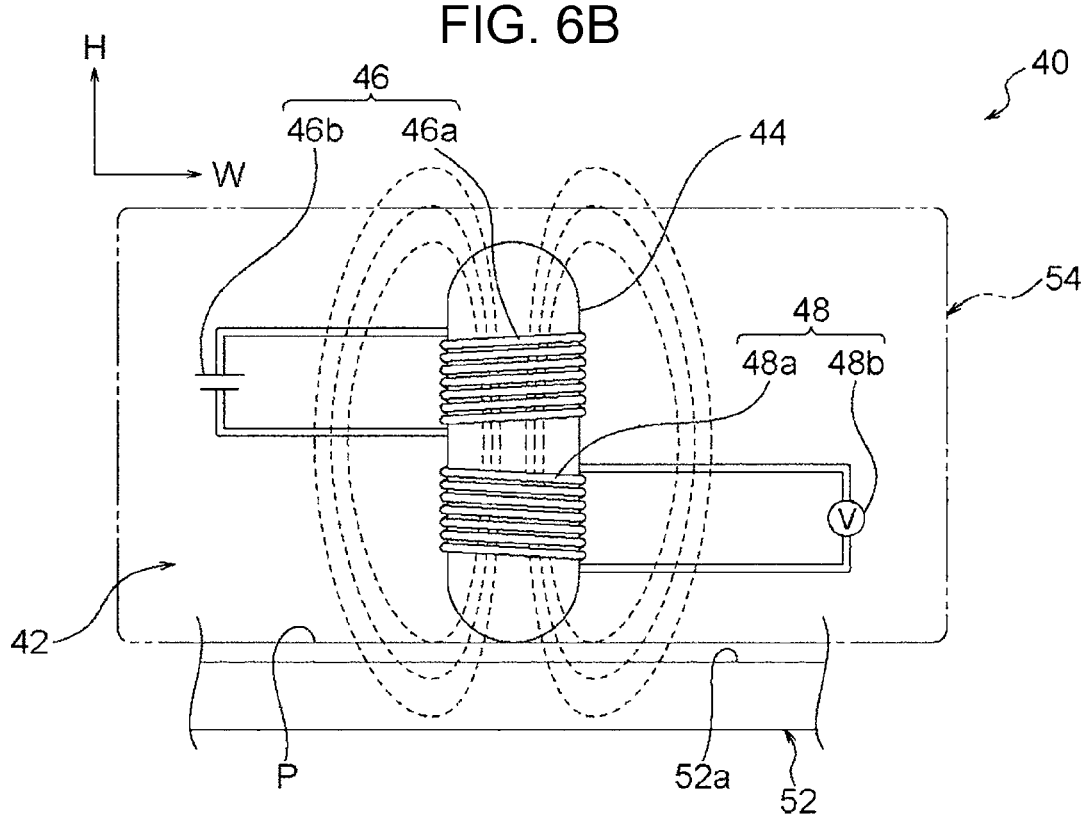

As illustrated in FIGS. 6A and 6B, the electromagnetic induction device 40 includes an electromagnetic induction unit 42 that is located above the sheet P when the sheet surface of the sheet P is oriented in the vertical direction, a support unit 52 that supports the sheet P from below, and a moving unit 54 that causes the electromagnetic induction unit 42 to move vertically.

—Electromagnetic Induction Unit 42—

The electromagnetic induction unit 42 includes a magnetic core 44 that extends in the apparatus height direction, a primary coil portion 46, and a secondary coil portion 48.

The magnetic core 44 extends in the vertical direction and is made of a magnetic metal so as to have a columnar shape with two ends each of which is formed in a spherical shape.

The primary coil portion 46 includes a coil portion 46a that is wound around an upper portion of the magnetic core 44 and a power supply 46b that applies a voltage to the coil portion 46a. The secondary coil portion 48 includes a coil portion 48a that is wound around a lower portion of the magnetic core 44 and a voltmeter 48b that measures the voltage generated in the coil portion 48a.

—Support Unit 52, Moving Unit 54—

The support unit 52 has a contact surface 52a that comes into contact with the sheet surface of the sheet P and is made of a magnetic metal. The moving unit 54 is formed by combining known machine element components and configured to cause the electromagnetic induction unit 42 to move toward and away from the sheet P. More specifically, the moving unit 54 is configured to cause the electromagnetic induction unit 42 to move between a farther position (see FIG. 6A) at which the electromagnetic induction unit 42 is far from the sheet P and a closer position (see FIG. 6B) at which the electromagnetic induction unit 42 is close to the sheet P. As a result, the electromagnetic induction unit 42 is located at the farther position or the closer position. Note that, in the present exemplary embodiment, as an example, the electromagnetic induction unit 42 moves with respect to the sheet P by a distance within a range of 3.0 mm or less. Note that, when the electromagnetic induction unit 42 comes close to the sheet P, the electromagnetic induction unit 42 may come into contact with the sheet P.

In the above configuration, a voltage is applied to the coil portion 46a by the power supply 46b of the electromagnetic induction unit 42 that is located at the farther position illustrated in FIG. 6A. As a result, a magnetic field is generated around the magnetic core 44 (see dashed lines in FIG. 6A). In addition, the moving unit 54 causes the electromagnetic induction unit 42 located at the farther position to move to the closer position illustrated in FIG. 6B. As a result, the magnetic field around the magnetic core 44 fluctuates, and the voltage generated in the coil portion 48a changes. Then, the change in the voltage generated in the coil portion 48a is measured by the voltmeter 48b.

Subsequently, the derivation unit 90 illustrated in FIG. 7 derives the thickness of the sheet P from the change in the voltage measured by the voltmeter 48b. More specifically, the derivation unit 90 derives the thickness of the sheet P from the change in the voltage by using a conversion table that is stored beforehand. Note that the thicker the sheet P, the smaller the change in the voltage.

[Attachment Unit 60]

As illustrated in FIG. 1, the attachment unit 60 includes an attachment member 62 and an attachment member 68. In the apparatus width direction, the attachment member 62 and the attachment member 68 are respectively disposed on one side and the other side with respect to the spectroscopic device 20, the ultrasonic device 30, and the electromagnetic induction device 40. The attachment members 62 and 68 sandwich the sheet P in such a manner that the sheet surface of the sheet P is oriented in the apparatus height direction. In this manner, the sheet P is attached to the attachment unit 60.

[Controller 80, Derivation Unit 90]

Figure 7:
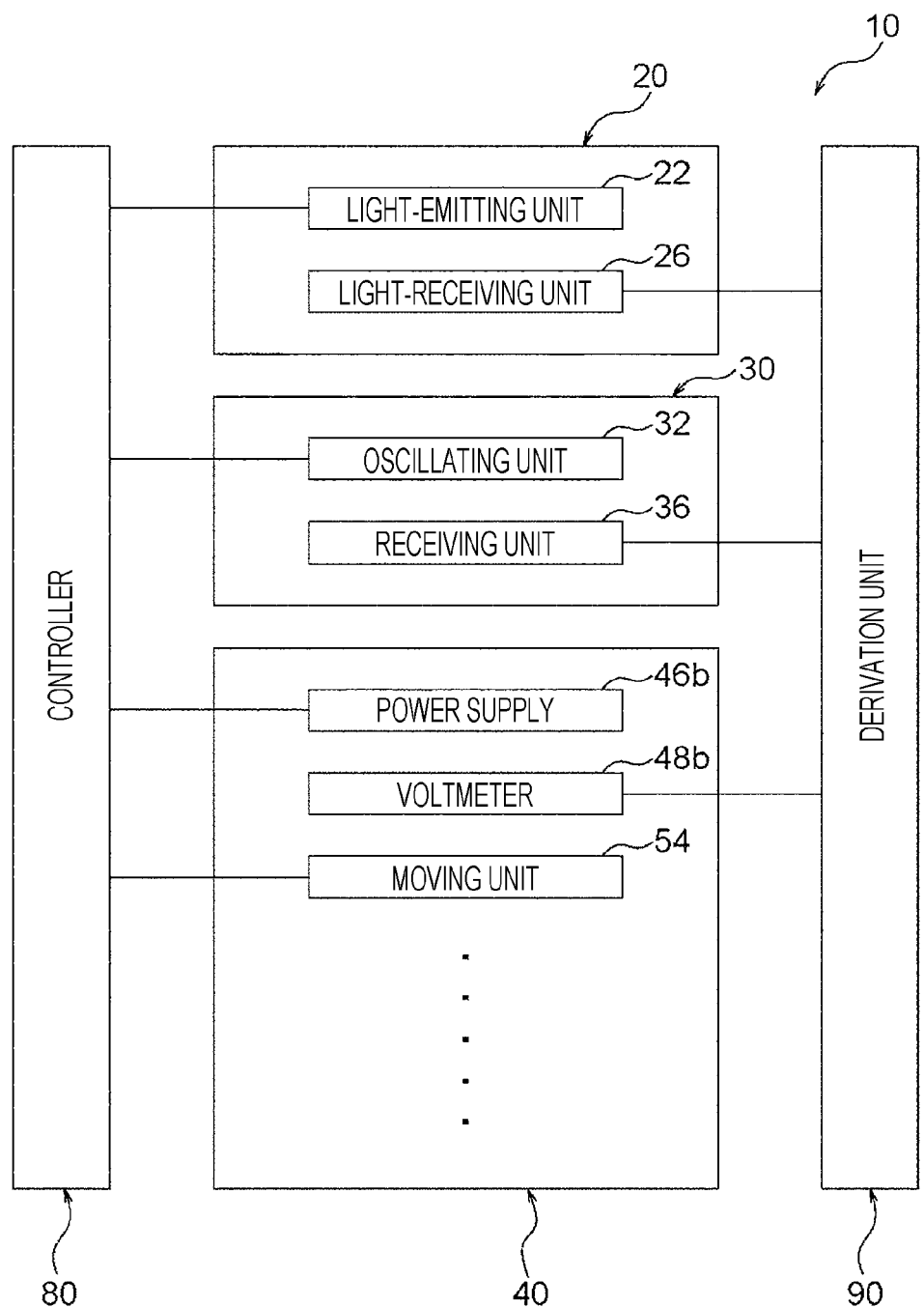
FIG. 7 is a control block diagram illustrating a controller included in the flexural-rigidity measuring apparatus according to the first exemplary embodiment of the present disclosure.

As illustrated in FIG. 7, the controller 80 is configured to control each of the units. The derivation unit 90 derives the flexural rigidity of the sheet P from measurement results obtained by the units. Note that the configuration of the controller 80 and the configuration of the derivation unit 90 will be described together with an operation of the flexural-rigidity measuring apparatus 10, which will be described later.

(Operation of Flexural-Rigidity Measuring Apparatus 10)

Operation of the flexural-rigidity measuring apparatus 10 will now be described with reference to the flowchart illustrated in FIG. 8. Note that, when the flexural-rigidity measuring apparatus 10 is in a non-operating state, the electromagnetic induction unit 42 is located at the farther position as illustrated in FIG. 6A. The operation, which will be described below, is performed as a result of the controller 80 controlling each unit.

First, a user attaches the sheet P to the attachment unit 60 of the flexural-rigidity measuring apparatus 10 and instructs the flexural-rigidity measuring apparatus 10 to perform measurement of the sheet P. Then, in step S100, the light-emitting unit 22 of the spectroscopic device 20 illustrated in FIG. 2 emits near-infrared light toward the sheet P.

In step S200, the light-receiving unit 26 receives light that has passed through the sheet P and disperses the received light into different wavelengths, and as illustrated in FIG. 3, the light-receiving unit 26 measures the intensity distribution (spectrum) of the light absorbed by the sheet P. In addition, the light-receiving unit 26 obtains, from the measurement result, the amount of moisture contained in the sheet P and the amount of ash contained in the sheet P. More specifically, the light-receiving unit 26 obtains the amount of moisture from the absorbance at a wavelength of 1,940 nm and obtains the amount of ash from the absorbance at a wavelength of 2,300 nm by using a conversion table that is stored beforehand.

Then, in step S300, the oscillating unit 32 of the ultrasonic device 30 illustrated in FIG. 4 intermittently oscillates an ultrasonic wave toward the sheet P.

Subsequently, in step S400, the receiving unit 36 receives the ultrasonic wave that has been attenuated by passing through the sheet P and measures the attenuation rate of the ultrasonic wave. In addition, the receiving unit 36 obtains the amplitude of the ultrasonic wave that has passed through the sheet P by using the attenuation rate of the ultrasonic wave and the distance between the oscillating unit 32 and the receiving unit 36 (d in FIG. 4). Furthermore, the receiving unit 36 obtains the basis weight of the sheet P from the amplitude of the ultrasonic wave, which has passed through the sheet P, by using a conversion table that is stored beforehand.

In step S500, a voltage is applied to the coil portion 46a by the power supply 46b of the electromagnetic induction unit 42 that is located at the farther position illustrated in FIG. 6A. As a result, a magnetic field is generated around the magnetic core 44 (see dashed lines in FIG. 6A). In addition, as illustrated in FIGS. 6A and 6B, the moving unit 54 causes the electromagnetic induction unit 42, which is located at the farther position, to move to the closer position.

As a result, the magnetic field generated around the magnetic core 44 fluctuates, so that the voltage of the current flowing through the coil portion 48a changes. In addition, the change in the voltage of the current flowing through the coil portion 48a is measured by the voltmeter 48b.

Subsequently, in step S600, the derivation unit 90 derives the thickness of the sheet P from the change in the voltage measured by the voltmeter 48b. More specifically, the derivation unit 90 derives the thickness of the sheet P from the change in the voltage by using a conversion table that is stored beforehand.

Then, in step S700, the derivation unit 90 derives the flexural rigidity of the sheet P from the amount of moisture contained in the sheet P, the amount of ash contained in the sheet P, the basis weight of the sheet P, and the thickness of the sheet P.

More specifically, the derivation unit 90 derives the flexural rigidity of the sheet P by substituting each value of the following Equation (1) into Equation (4). Note that, the letters a, b, and c in Equation (4) are each a constant that is obtained from the value of the flexural rigidity of the sheet P measured by a measuring apparatus of the related art. More specifically, a plurality of types of sheets P are cut, and the flexural rigidity of each of these cut sheets P is measured by attaching the sheets P to a measuring apparatus of the related art. In addition, after the flexural rigidity of each of these sheets P has been measured, the amount of moisture contained in each of the sheets P, the amount of ash contained in each of the sheets P, the basis weight of each of the sheets P, and the thickness of each of the sheets P are obtained through the above-described process. Subsequently, the value of flexural rigidity measured by the measuring apparatus of the related art and the amount of moisture, the amount of ash, the basis weight, and the thickness that have been obtained are substituted into Equation (4). Then, the values of a, b, and c are determined. Equation (4) is an example of Equation (Z).

Note that, as a measuring apparatus of the related art, a bending stiffness tester No. 2048-BF manufactured by Kumagai Riki Kogyo Co., Ltd. is used.

$$\text{basis weight (g/m}^2\text{)/thickness (m)} = \text{density} \quad \text{Equation (1)}$$

$$\text{amount of moisture (g/m}^2\text{)/basis weight (g/m}^2\text{)} = \text{moisture content} \quad \text{Equation (2)}$$

$$\text{amount of ash (g/m}^2\text{)/basis weight (g/m}^2\text{)} = \text{ash content ratio} \quad \text{Equation (3)}$$

$$\text{thickness}^3 \times (a \times \text{density} + b \times \text{moisture content} + c \times \text{ash content}) = \text{flexural rigidity} \quad \text{Equation (4)}$$

As mentioned above, in Equation (4), "a×density+b× moisture content+c×ash content" is used as the Young's modulus. This is based on the knowledge that the density of the sheet P, the moisture content of the sheet P, and the ash content of the sheet P contribute to the Young's modulus of the sheet P.

(Comparison with Flexural-Rigidity Measuring Apparatuses According to Comparative Examples)

Next, the flexural rigidity of the sheet P that is derived by flexural-rigidity measuring apparatus according to a first comparative example, the flexural rigidity of the sheet P that is derived by flexural-rigidity measuring apparatus according to a second comparative example, and the flexural rigidity of the sheet P that is derived by the flexural-rigidity measuring apparatus 10 according to the first exemplary embodiment will be compared.

[Flexural-Rigidity Measuring Apparatus of First Comparative Example]

First, the flexural rigidity of the sheet P that is derived by the flexural-rigidity measuring apparatus of the first comparative example will be described. The flexural-rigidity measuring apparatus of the first comparative example derives the flexural rigidity only from the thickness of the sheet P. In other words, the flexural rigidity of the sheet P is derived by setting all the constants a, b, and c in the above-mentioned Equation (4) to zero.

Figure 9A:
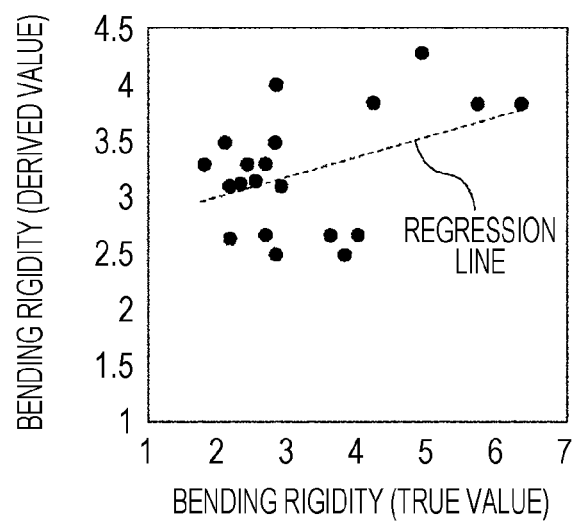
FIGS. 9A and 9B are scatter diagram graphs each illustrating flexural rigidity derived from a flexural-rigidity measuring apparatus according to a comparative example of the first exemplary embodiment of the present disclosure.

FIG. 9A is a scatter diagram graph illustrating the flexural rigidity of the sheet P derived by the flexural-rigidity measuring apparatus according to the first comparative example. The horizontal axis denotes the true value of the flexural rigidity, and the vertical axis denotes the value of the flexural rigidity derived by the flexural-rigidity measuring apparatus of the first comparative example. Note that the true value of the flexural rigidity denoted by the horizontal axis is the value of the flexural rigidity of the sheet P measured by a measuring apparatus of the related art.

As illustrated in FIG. 9A, the flexural rigidity of the sheet P derived by the flexural-rigidity measuring apparatus of the first comparative example varies greatly with respect to a regression line.

[Flexural-Rigidity Measuring Apparatus of Second Comparative Example]

Next, the flexural rigidity of the sheet P that is derived by the flexural-rigidity measuring apparatus of the second comparative example will be described. The flexural-rigidity measuring apparatus of the second comparative example derives the flexural rigidity only from the thickness of the sheet P, the basis weight of the sheet P, and the amount of moisture contained in the sheet P. In other words, the flexural rigidity is derived by setting the constant c in the above-mentioned Equation (4) to zero.

Figure 9B:
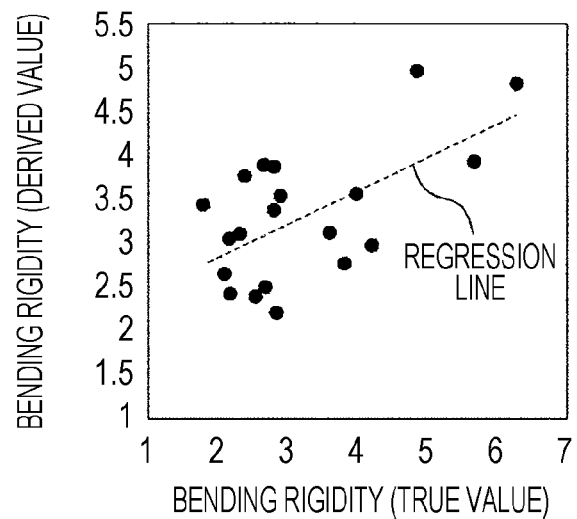

FIG. 9B is a scatter diagram graph illustrating the flexural rigidity of the sheet P derived by the flexural-rigidity measuring apparatus according to the second comparative example. The horizontal axis denotes the true value of the flexural rigidity, and the vertical axis denotes the value of the flexural rigidity derived by the flexural-rigidity measuring apparatus of the second comparative example.

As illustrated in FIG. 9B, the flexural rigidity of the sheet P derived by the flexural-rigidity measuring apparatus of the second comparative example varies with respect to a regression line.

[Flexural-Rigidity Measuring Apparatus 10 of First Exemplary Embodiment]

Next, the flexural rigidity of the sheet P derived by the flexural-rigidity measuring apparatus 10 of the first exemplary embodiment will be described. As described above, the flexural-rigidity measuring apparatus 10 of the first exemplary embodiment derives flexural rigidity from the thickness of the sheet P, the basis weight of the sheet P, the amount of moisture contained in the sheet P, and the amount of ash contained in the sheet P.

Figure 9C:
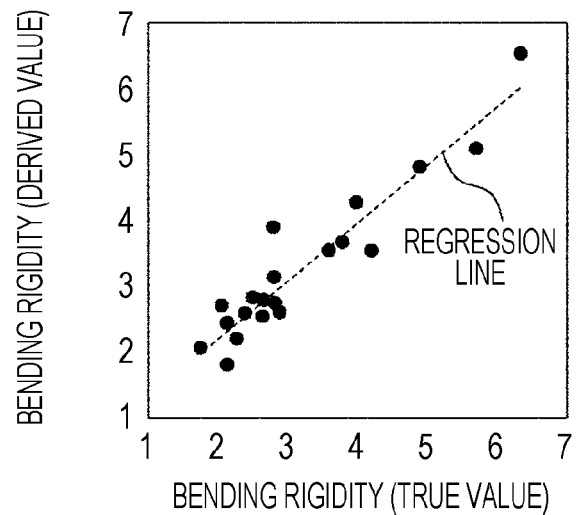
FIG. 9C is a scatter diagram graph illustrating flexural rigidity derived from the flexural-rigidity measuring apparatus according to the first exemplary embodiment of the present disclosure.

FIG. 9C is a scatter diagram graph illustrating flexural rigidity derived from the flexural-rigidity measuring apparatus 10 according to the first exemplary embodiment. The horizontal axis denotes the true value of the flexural rigidity, and the vertical axis denotes the value of the flexural rigidity derived by the flexural-rigidity measuring apparatus 10.

As illustrated in FIG. 9C, the flexural rigidity of the sheet P derived from the flexural-rigidity measuring apparatus 10 varies, with respect to a regression line, less than the flexural rigidity derived by the flexural-rigidity measuring apparatus of the first comparative example and less than the flexural rigidity derived by the flexural-rigidity measuring apparatus of the second comparative example.

(Summary)

As described above, the flexural-rigidity measuring apparatus 10 measures the flexural rigidity of the sheet P without processing the sheet P such that the sheet P has a predetermined size.

Since the flexural-rigidity measuring apparatus 10 measures the flexural rigidity of the sheet P without processing the sheet P, the flexural rigidity of the sheet P is derived immediately before an image is formed onto the sheet P. In addition, since the flexural rigidity of the sheet P is derived immediately before an image is formed onto the sheet P, the flexural rigidity is utilized for control of a printing condition or for a design test and reflected in a highly reliable design.

In the flexural-rigidity measuring apparatus 10, the spectroscopic device 20, the ultrasonic device 30, and the electromagnetic induction device 40 are arranged in the horizontal direction so as to be capable of measuring parameters of the sheet P at their positions. As a result, the basis weight of the sheet P, the thickness of the sheet P, the amount of moisture contained in the sheet P, and the amount of ash contained in the sheet P are measured without moving each unit.

Second Exemplary Embodiment

An example of a flexural-rigidity measuring apparatus according to a second exemplary embodiment of the present disclosure will be described with reference to FIG. 10 and FIG. 11. Note that differences between the second exemplary embodiment and the first exemplary embodiment will be described.

Figure 10:
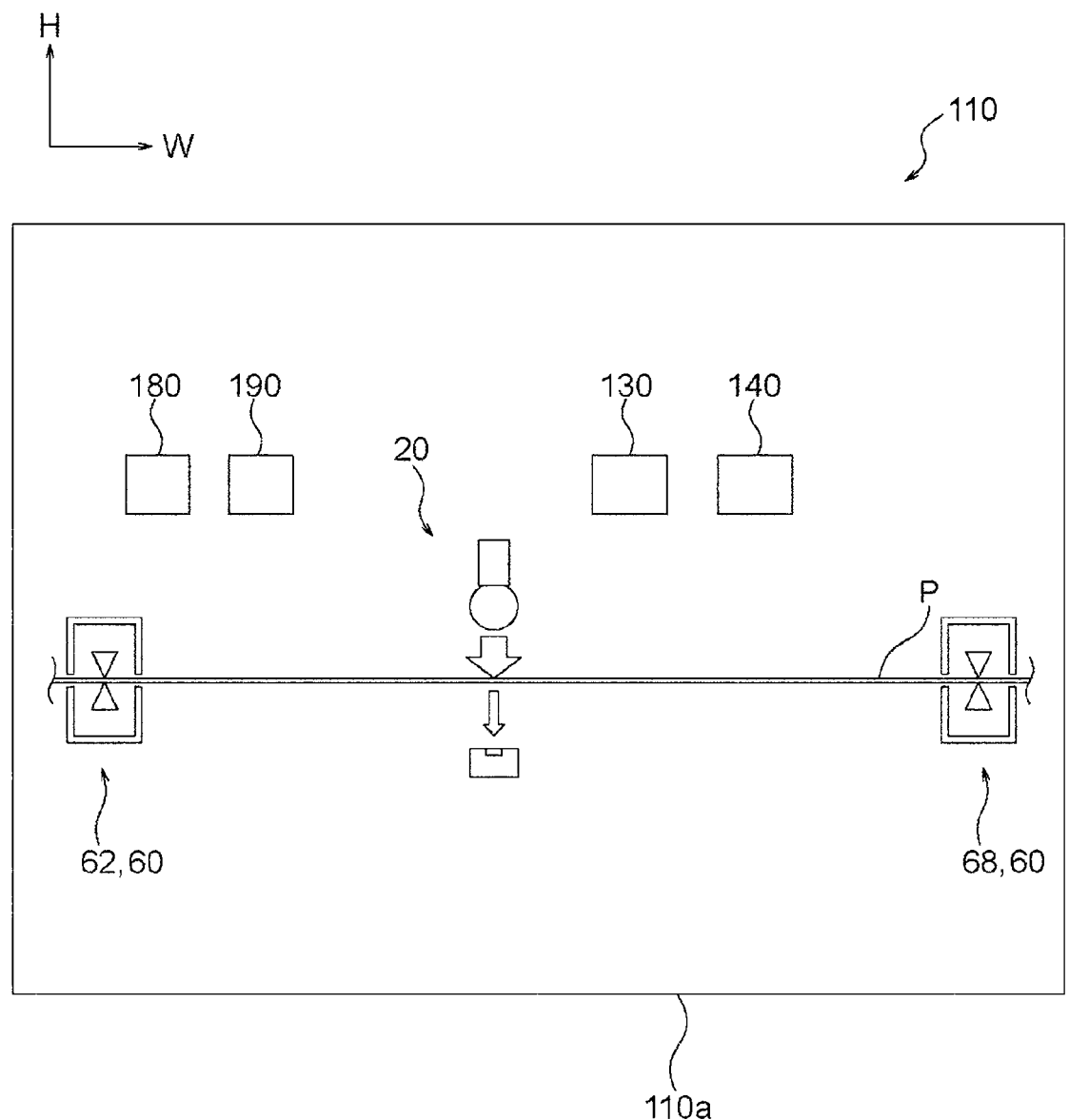
FIG. 10 is a schematic diagram illustrating a configuration of a flexural-rigidity measuring apparatus according to a second exemplary embodiment of the present disclosure.

As illustrated in FIG. 10, a flexural-rigidity measuring apparatus 110 of the second exemplary embodiment includes an apparatus body 110a, the spectroscopic device 20, an input unit 130 to which a user may input the basis weight of the sheet P, and an input unit 140 to which a user may input the thickness of the sheet P. The flexural-rigidity measuring apparatus 110 further includes the attachment unit 60 to which the sheet P is attached, a controller 180 that controls the spectroscopic device 20, and a derivation unit 190 that derives the flexural rigidity of the sheet P. The input unit 130 is an example of a first acquisition unit, and the input unit 140 is an example of a second acquisition unit.

[Controller 180, Derivation Unit 190]

Figure 11:
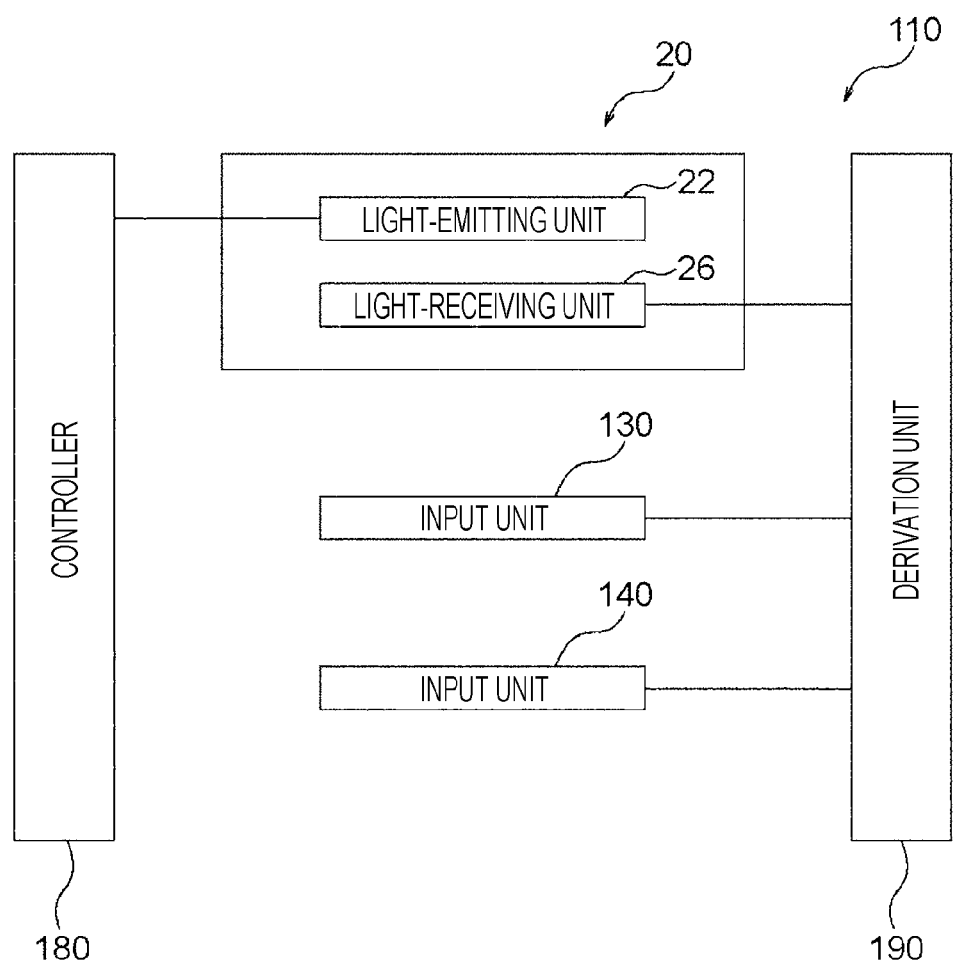
FIG. 11 is a control block diagram illustrating a controller included in the flexural-rigidity measuring apparatus according to the second exemplary embodiment of the present disclosure.

As illustrated in FIG. 11, the controller 180 is configured to control the spectroscopic device 20. The derivation unit 190 derives the flexural rigidity of the sheet P by using the basis weight input to the input unit 130, the thickness input to the input unit 140, and the amount of moisture and the amount of ash which are obtained by the light-receiving unit 26 of the spectroscopic device 20.

The controller 180 includes a central processing unit (CPU), read only memory (ROM), random access memory (RAM), a storage, and a communication interface (I/F). These components are connected to one another via a bus so as to be capable of communicating with one another.

[Effects, Summary]

As described above, since the flexural-rigidity measuring apparatus 110 does not use an ultrasonic device and an electromagnetic induction device, the size of the flexural-rigidity measuring apparatus 110 may be smaller compared with the case where the flexural-rigidity measuring apparatus 110 uses an ultrasonic device and an electromagnetic induction device.

The other effects are similar to those in the first exemplary embodiment other than the effect that is obtained by including the ultrasonic device 30 and the electromagnetic induction device 40 in the flexural-rigidity measuring apparatus 10.

Third Exemplary Embodiment

An example of a flexural-rigidity measuring apparatus according to a third exemplary embodiment of the present disclosure will be described with reference to FIG. 12 and FIG. 13. Note that differences between the third exemplary embodiment and the first exemplary embodiment will be described.

Figure 12:
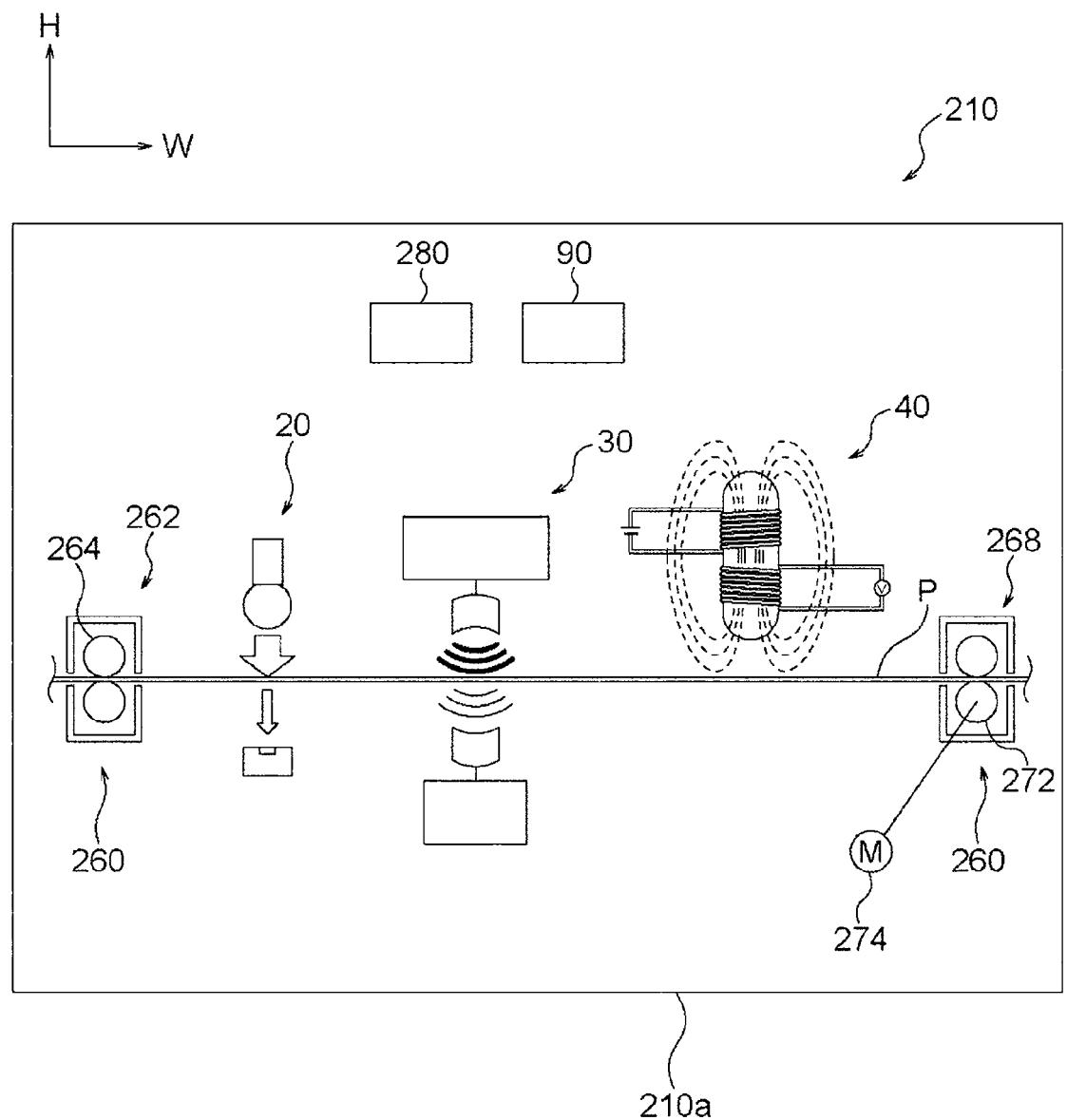
FIG. 12 is a schematic diagram illustrating a configuration of a flexural-rigidity measuring apparatus according to a third exemplary embodiment of the present disclosure.

As illustrated in FIG. 12, a flexural-rigidity measuring apparatus 210 of the third exemplary embodiment includes an apparatus body 210a, the spectroscopic device 20, the ultrasonic device 30, and the electromagnetic induction device 40. The flexural-rigidity measuring apparatus 210 further includes a transport unit 260 that transports the sheet P attached thereto, a controller 280 that control each unit, and the derivation unit 90 that derives the flexural rigidity of the sheet P.

[Transport Unit 260]

As illustrated in FIG. 12, the transport unit 260 includes a delivery unit 262 and a receiving unit 268. In the apparatus width direction, the delivery unit 262 and the receiving unit 268 are respectively disposed on one side and the other side with respect to the spectroscopic device 20, the ultrasonic device 30, and the electromagnetic induction device 40.

The delivery unit 262 includes a pair of roller portions 264 that sandwich the sheet P in such a manner that the sheet surface of the sheet P is oriented in the apparatus height direction. The receiving unit 268 includes a pair of roller portions 272 that sandwich the sheet P in such a manner that the sheet surface of the sheet P is oriented in the apparatus height direction and a driving unit 274 that applies a force that causes the roller portions 272 to rotate to the roller portions 272.

[Controller 280]

Figure 13:
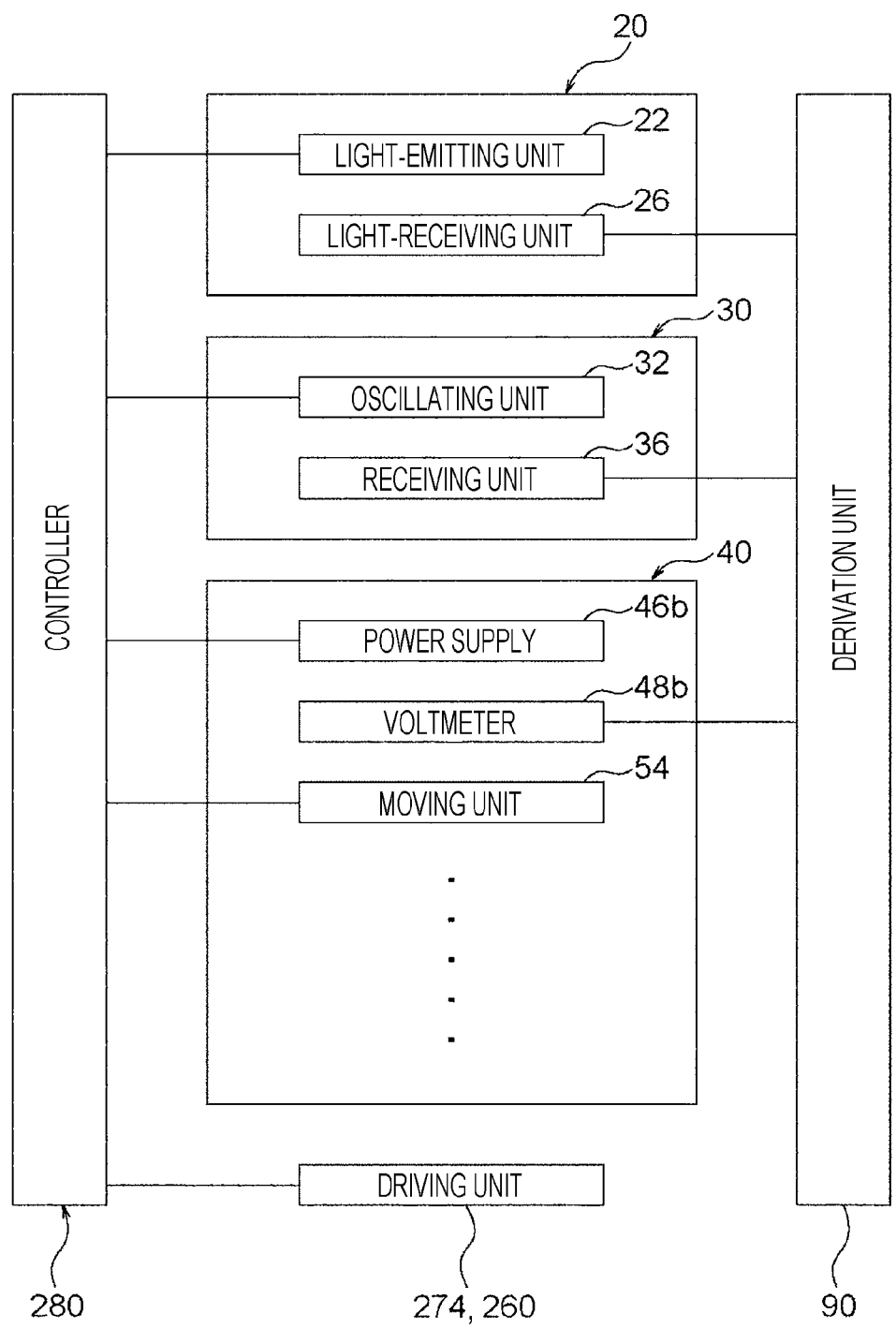
FIG. 13 is a control block diagram illustrating a controller included in the flexural-rigidity measuring apparatus according to a fourth exemplary embodiment of the present disclosure.

As illustrated in FIG. 13, the controller 280 is configured to control the driving unit 274 of the transport unit 260.

In the above configuration, the controller 280 controls the driving unit 274 and transports the sheet P from one side to the other side in the apparatus width direction in such a manner that near-infrared light emitted by the light-emitting unit 22 of the spectroscopic device 20 and an ultrasonic wave oscillated by the oscillating unit 32 of the ultrasonic device 30 pass through substantially the same portion of the sheet P and that the electromagnetic induction unit 42 comes close to the substantially the same portion of the sheet P. Here, the phrase "substantially the same portion of the sheet P" refers to the case where the center of the ultrasonic wave passes through the inside of a circle having a radius of 20 mm centered on a portion of the sheet P through which the near-infrared light emitted by the light-emitting unit 22 has passed and where the center of the electromagnetic induction unit 42 comes close to the sheet P within the circle.

[Effects, Summary]

As described above, in the flexural-rigidity measuring apparatus 210, the sheet P is moved, so that each of the units measures the same portion of the sheet P. As a result, the precision with which the flexural rigidity of the sheet P is derived may be improved compared with the case where the units measure different portions of the sheet P.

The other effects of the flexural-rigidity measuring apparatus 210 are similar to the effects of the flexural-rigidity measuring apparatus 10 of the first exemplary embodiment.

Note that although specific exemplary embodiments of the present disclosure have been described in detail, the present disclosure is not limited to the exemplary embodiments, and it is obvious to those skilled in the art that the present disclosure may employ other various exemplary embodiments within the scope of the present disclosure. For example, in the above-described first exemplary embodiment, although the spectroscopic device 20, the ultrasonic device 30, and the electromagnetic induction device 40 measure parameters of the sheet P in this order, they may measure the parameters of the sheet P in a different order.

In addition, in the above-described first exemplary embodiment, although the spectroscopic device 20, the ultrasonic device 30, and the electromagnetic induction device 40 measure parameters of the sheet P in this order, they may measure parameters of the sheet P at the same time.

In the above-described second exemplary embodiment, although the flexural-rigidity measuring apparatus 110 obtains a basis weight from the basis weight input to the input unit 130 and obtains the thickness of the sheet P by the thickness input to the input unit 140, for example, a user may input the product number of the sheet P to the flexural-rigidity measuring apparatus 110, so that the flexural-rigidity measuring apparatus 110 may obtain the basis weight and the thickness of the sheet P.

In addition, in the above-described second exemplary embodiment, although the flexural-rigidity measuring apparatus 110 obtains a basis weight from the basis weight input to the input unit 130 and obtains the thickness of the sheet P by the thickness input to the input unit 140, for example, the flexural-rigidity measuring apparatus 110 may obtain the basis weight and the thickness of the sheet P by communication or the like.

In the above-described third exemplary embodiment, although the sheet P is moved with respect to the spectroscopic device 20, the ultrasonic device 30, and the electromagnetic induction device 40, the spectroscopic device 20, the ultrasonic device 30, and the electromagnetic induction device 40 may be moved with respect to the sheet P, or the sheet P, the spectroscopic device 20, the ultrasonic device 30, and the electromagnetic induction device 40 may all be moved.

In addition, in the above-described exemplary embodiments, although the derivation units 90 and 190 are provided separately from the controllers 80, 180, and 280, the derivation unit may be provided in the controller.

Furthermore, in the above-described exemplary embodiments, although the light-emitting unit 22 of the spectroscopic device 20 emits near-infrared light, the light-emitting unit 22 may emit light of other wavelengths as long as it emits near-infrared light.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A flexural-rigidity measuring apparatus comprising:
an ultrasonic device including an oscillating unit that oscillates an ultrasonic wave toward a sheet and a receiving unit that receives the ultrasonic wave that has passed through the sheet;
an electromagnetic induction device including an electromagnetic induction unit that generates electromagnetic induction with respect to a sheet; and
a near-infrared spectroscopic device including a light-emitting unit that emits near-infrared light toward a sheet and a light-receiving unit that receives the near-infrared light that has passed through the sheet.

2. The flexural-rigidity measuring apparatus according to claim 1, further comprising:
a derivation unit that derives flexural rigidity of a sheet by using a measurement result of the ultrasonic device, a measurement result of the electromagnetic induction device obtained by causing the electromagnetic induction unit to move toward and away from the sheet, and a measurement result of the near-infrared spectroscopic device.

3. The flexural-rigidity measuring apparatus according to claim 2,
wherein the derivation unit derives the flexural rigidity of the sheet by using a basis weight of the sheet that is obtained from the measurement result of the ultrasonic device, a thickness of the sheet that is obtained from the measurement result of the electromagnetic induction device, an amount of moisture in the sheet that is obtained from the measurement result of the near-infrared spectroscopic device, and an amount of ash in the sheet that is obtained from the measurement result of the near-infrared spectroscopic device.

4. The flexural-rigidity measuring apparatus according to claim 3,
wherein the ultrasonic device, the electromagnetic induction device, and the near-infrared spectroscopic device are arranged in such a manner as to face a sheet attached to an apparatus body.

5. The flexural-rigidity measuring apparatus according to claim 4,
wherein the derivation unit derives the flexural rigidity of the sheet by using Equation (Z):

$$K=T^3 \times (a \cdot B/T + b \cdot W/B + c \cdot A/B) \quad (Z)$$

where K stands for the flexural rigidity of the sheet, T stands for the thickness of the sheet, B stands for the basis weight of the sheet, W stands for the amount of moisture contained in the sheet, and A stands for the amount of ash contained in the sheet, and
where a, b, and c are each a predetermined constant.

6. The flexural-rigidity measuring apparatus according to claim 3, wherein the derivation unit derives the flexural rigidity of the sheet by using Equation (Z):

$$K=T^3 \times (a \cdot B/T + b \cdot W/B + c \cdot A/B) \quad (Z)$$

where K stands for the flexural rigidity of the sheet, T stands for the thickness of the sheet, B stands for the basis weight of the sheet, W stands for the amount of moisture contained in the sheet, and A stands for the amount of ash contained in the sheet, and
where a, b, and c are each a predetermined constant.

7. The flexural-rigidity measuring apparatus according to claim 2,
wherein the ultrasonic device, the electromagnetic induction device, and the near-infrared spectroscopic device are arranged in such a manner as to face a sheet attached to an apparatus body.

8. The flexural-rigidity measuring apparatus according to claim 7,
wherein the derivation unit derives the flexural rigidity of the sheet by using Equation (Z):

$$K=T^3 \times (a \cdot B/T + b \cdot W/B + c \cdot A/B) \quad (Z)$$

where K stands for the flexural rigidity of the sheet, T stands for the thickness of the sheet, B stands for the basis weight of the sheet, W stands for the amount of moisture contained in the sheet, and A stands for the amount of ash contained in the sheet, and
where a, b, and c are each a predetermined constant.

9. The flexural-rigidity measuring apparatus according to claim 1,
wherein the ultrasonic device, the electromagnetic induction device, and the near-infrared spectroscopic device are arranged in such a manner as to face a sheet attached to an apparatus body.

10. A flexural-rigidity measuring apparatus comprising:
a first acquisition unit that acquires a basis weight of a sheet;
a second acquisition unit that acquires a thickness of a sheet; and
a near-infrared spectroscopic device including a light-emitting unit that emits near-infrared light toward a sheet and a light-receiving unit that receives the near-infrared light that has passed through the sheet.

11. The flexural-rigidity measuring apparatus according to claim 10, further comprising:
a derivation unit that derives flexural rigidity of a sheet by using the basis weight of the sheet acquired by the first acquisition unit, the thickness of the sheet acquired by the second acquisition unit, and a measurement result of the near-infrared spectroscopic device.

12. The flexural-rigidity measuring apparatus according to claim 11,
wherein the derivation unit derives the flexural rigidity of the sheet by using the basis weight of the sheet, the thickness of the sheet, an amount of moisture in the sheet that is obtained from the measurement result of the near-infrared spectroscopic device, and an amount of ash in the sheet that is obtained from the measurement result of the near-infrared spectroscopic device.

13. The flexural-rigidity measuring apparatus according to claim 12,
wherein the derivation unit derives the flexural rigidity of the sheet by using Equation (Z):

$$K=T^3 \times (a \cdot B/T + b \cdot W/B + c \cdot A/B) \quad (Z)$$

where K stands for the flexural rigidity of the sheet, T stands for the thickness of the sheet, B stands for the basis weight of the sheet, W stands for the amount of moisture contained in the sheet, and A stands for the amount of ash contained in the sheet, and where a, b, and c are each a predetermined constant.

14. A method for measuring flexural rigidity comprising:

oscillating an ultrasonic wave toward a sheet and receiving the ultrasonic wave that has passed through the sheet;

generating electromagnetic induction with respect to a sheet; and emitting near-infrared light toward a sheet and receiving the near-infrared light that has passed through the sheet.

\* \* \* \* \*